United States Patent [19]
Suzuki et al.

[11] Patent Number: 5,457,765
[45] Date of Patent: Oct. 10, 1995

[54] APPARATUS FOR ADJUSTING ALIGNMENT OF OPTICAL FIBERS

[75] Inventors: Isao Suzuki, Sakura; Yasuo Suzuki, Kawasaki; Kenji Takahashi, Sakura; Michio Morooka, Chiba; Mikio Yoshinuma, Yachiyo; Shinichi Aoshima, Mito, all of Japan

[73] Assignees: Fujikura Ltd.; Nippon Telegraph and Telephone Corporation, both of Tokyo, Japan

[21] Appl. No.: 294,806

[22] Filed: Aug. 25, 1994

[30] Foreign Application Priority Data

Aug. 26, 1993 [JP] Japan .................................. 5-234027
Dec. 25, 1993 [JP] Japan .................................. 5-348150
Dec. 25, 1993 [JP] Japan .................................. 5-348151

[51] Int. Cl.$^6$ .................................................. G02B 6/36
[52] U.S. Cl. ............................ 385/137; 385/65; 385/83; 385/97
[58] Field of Search ............................... 385/65, 83, 97, 385/98, 137

[56] References Cited

U.S. PATENT DOCUMENTS 4,659,175  4/1987  Wilde ..................... 385/97 X
5,080,458  1/1992  Hockaday ................. 385/14

FOREIGN PATENT DOCUMENTS 57-035816  6/1982  Japan .
63-110404  5/1988  Japan .
3-280710  10/1991  Japan .
5093815    4/1993  Japan .
5-273430   10/1993  Japan .

OTHER PUBLICATIONS

"The Development of an Optical Fiber Splicer Using a Profile Alignment System", Tsutomu Onodera et al, Fujikura Technical Review, No. 16, pp. 16–18, (1987)(Apr.).
Aoshima et al., "Compact Mass Axis Alignment Device with Piezoelements for Optical Fibers," IEEE Photonics Technology Letters, May 4, 1992, No. 5. pp. 992–994.

Primary Examiner—John D. Lee
Attorney, Agent, or Firm—Finnegan, Henderson, Farabow, Garrett & Dunner

[57] ABSTRACT

An apparatus for adjusting the alignment of the optical fibers at a high precision, formed by a base frame having a plurality of pairs of V-grooves for mounting the optical fibers at mutually facing sides of the base frame, each V-groove being defined by a fixed member and a movable member, each movable member being movable within a guide groove defined between each adjacent fixed members, and one of each pair of V-grooves on one of the mutually facing sides has the fixed member and the movable member facing against the movable member and the fixed member, respectively, of another one of each pair of V-grooves on another one of the mutually facing sides; and a plurality of piezoelectric elements, each of which is connected with each movable member of each V-groove, for causing each movable member to move within the guide groove such that a displacement of each movable member makes an adjustment of a position of an optical fiber mounted on each V-groove.

15 Claims, 10 Drawing Sheets

FIG.1

PRIOR ART

APPARATUS FOR ADJUSTING ALIGNMENT OF OPTICAL FIBERS

BACKGROUND OF THE INVENTION

1. Field of the Invention

The present invention relates to an apparatus for adjusting an alignment of optical fibers constituting optical fiber ribbons, which is useful in the fusion splicing of the optical fibers for example.

2. Description of the Background Art

Conventionally, in the collective fusion splicing of the optical fibers constituting the optical fiber ribbon, the alignment of the core axes of the optical fibers to be fusion spliced has been achieved by mounting the optical fibers to be fusion spliced on V-grooves for fixedly mounting the optical fibers which are precisely machined along a straight line so as to be able to align the cladding axes of the optical fibers to be fusion spliced, and then by utilizing the self-alignment effect of the optical fibers due to the surface tension exerted on the optical fibers during the discharge heating process.

However, this surface tension is not quite sufficient to reduce the connection loss significantly, and there still remains a need for adjusting the alignment of each optical fiber.

Figure 1:
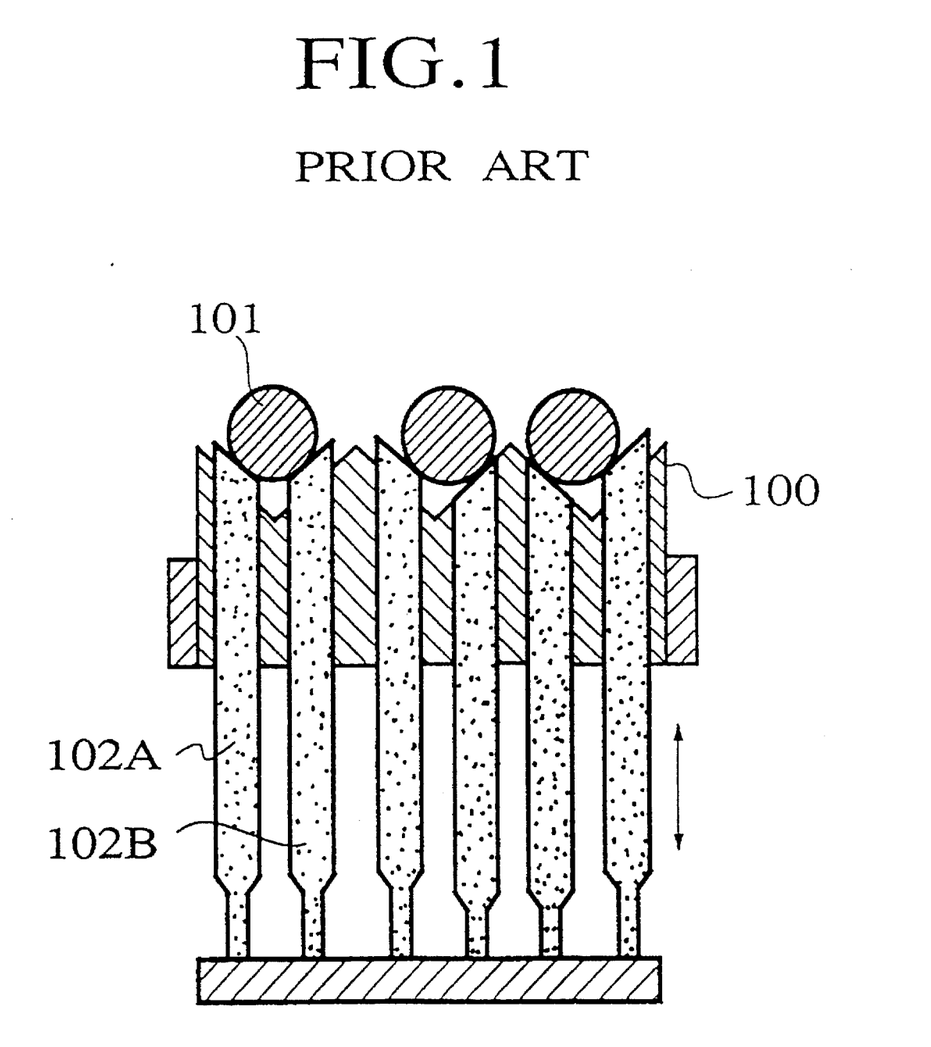
FIG. 1 is a schematic cross sectional view of a conventional apparatus for adjusting the alignment of the optical fibers.

For this purpose, there has been an apparatus for adjusting the alignment of each optical fiber in the optical fiber ribbon individually, as disclosed in Japanese Patent Application Laid Open No. 5-273430 (1993) which has a configuration as shown in FIG. 1.

In this apparatus of FIG. 1, for each optical fiber 101, there is provided a pair of movable members 102A and 102B having approximately 45° inclined end faces to form a V-groove for mounting each optical fiber 101, each of which is supported by a stationary fixed guide member 100 to be minutely movable up or down, and moved up or down by a stack type piezoelectric element. The position of the optical fiber 101 is adjusted in a desired direction by the appropriate combination of the up and down minute movements of these movable members 102A and 102B so as to adjust the alignment of the optical fibers.

In this conventional apparatus of FIG. 1, in a case of dealing with the SM (single-mode) type optical fiber which has an outer diameter equal to 125 μm, considering the thickness of a part of the guide member 100 to be provided between the pair of the movable members 102A and 102B, it is necessary for each of the movable members 102A and 102B to have a thickness not greater than 100 μm, but in practice, it is quite difficult to improve the manufacturing precision for the thickness in an order of tens of μm, and the movable member can be damaged very easily. In addition, such thin movable members can be bent very easily, so that the operation to assemble these movable members into a form shown in FIG. 1 has been rather difficult.

On the other hand, there has also been a proposition for the apparatus for adjusting the alignment of each optical fiber in the optical fiber ribbon individually as disclosed in Japanese Patent Application No. H3-280710 (1991), which is suitable for the optical fiber ribbon with a narrow pitch interval between adjacent optical fibers. In this apparatus, in a ease of dealing with the SM type optical fiber having an outer diameter equal to 125 μm, the movable member for pressing the optical fiber is required to have a thickness of about 180 μm, so that the manufacturing of the end face of the movable member is easier and the problem of damaging or the difficulty in assembling can also be reduced compared with the apparatus of FIG. 1.

However, in this apparatus disclosed in Japanese Patent Application No. H3-280710 (1991), the adjacent movable members slide with respect to each other while keeping mutual surface contact, so that there has been a problem that the minute movement of one movable member can be propagated to the neighboring movable members and as a result the already adjusted position of the other optical fiber can be displaced during the adjustment of one optical fiber.

SUMMARY OF THE INVENTION

It is therefore an object of the present invention to provide an apparatus for adjusting the alignment of the optical fibers for which the required surface manufacturing operation is easy while the handling and assembling of the movable members are improved in its manufacturing process, and in which the adjustment of each optical fiber does not affect the adjustment state of the neighboring optical fiber, such that the high precision adjustment of the alignment of the optical fibers can be realized.

According to one aspect of the present invention there is provided an apparatus for adjusting an alignment of optical fibers, comprising: a base frame having a plurality of pairs of V-grooves for mounting the optical fibers at mutually facing sides of the base frame, each V-groove being defined by a fixed member and a movable member, each movable member being movable within a guide groove defined between each adjacent fixed members, and one of each pair of V-grooves on one of said mutually facing sides has the fixed member and the movable member facing against the movable member and the fixed member, respectively, of another one of said each pair of V-grooves on another one of said mutually facing sides; and a plurality of piezoelectric elements, each of which is connected with each movable member of each V-groove, for causing said each movable member to move within the guide groove such that a displacement of said each movable member makes an adjustment of a position of an optical fiber mounted on said each V-groove.

According to another aspect of the present invention there is provided an apparatus for adjusting an alignment of optical fibers, comprising: a base frame having at least one pair of V-grooves for mounting the optical fibers at mutually facing sides of the base frame, each V-groove being defined by a fixed member and a movable member which is movable within a guide groove defined by the fixed member, and one of said pair of V-grooves on one of said mutually facing sides has the fixed member and the movable member facing against the movable member and the fixed member, respectively, of another one of said pair of V-grooves on another one of said mutually facing sides; and at least one piezoelectric element connected with the movable member of each V-groove, for causing the movable member to move within the guide groove such that a displacement of the movable member makes an adjustment of a position of an optical fiber mounted on said each V-groove.

Other features and advantages of the present invention will become apparent from the following description taken in conjunction with the accompanying drawings.

DETAILED DESCRIPTION OF THE PREFERRED EMBODIMENTS

Now, one embodiment of an apparatus for adjusting an alignment of optical fibers according to the present invention will be described in detail.

Figure 2:
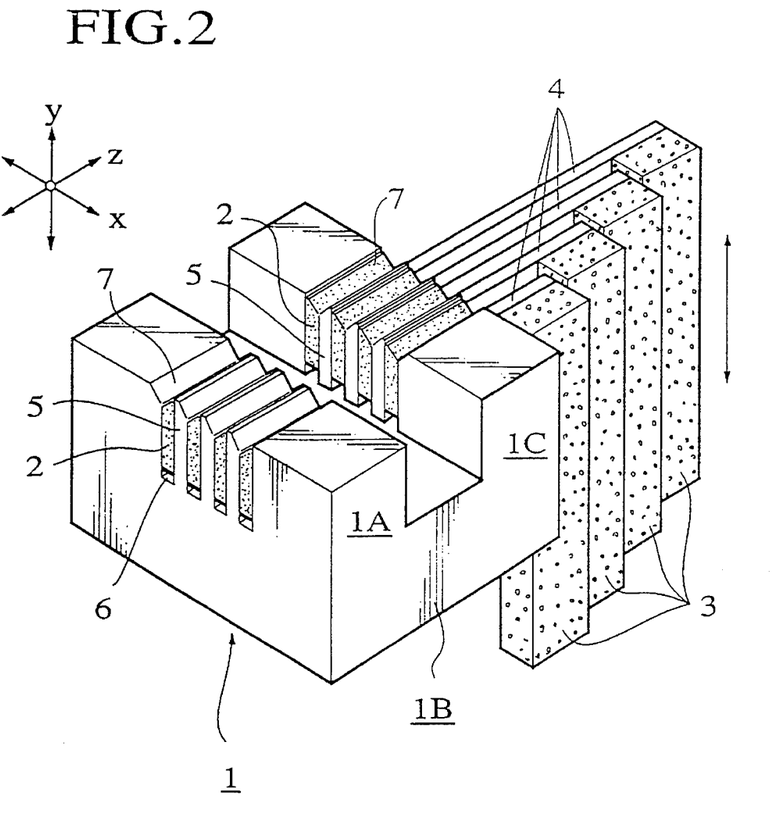
FIG. 2 is a schematic overall perspective view of one embodiment of apparatus for adjusting the alignment of the optical fibers according to the present invention.

In this embodiment, as shown in an overall perspective view of FIG. 2, the apparatus comprises a base frame 1 including side bank portions 1A and 1C sandwiching a central portion 1B to be located directly below the discharge region in the fusion splicing process. The side bank portions 1A and 1C have the same number of V-grooves 7 for mounting the optical fibers formed on their upper surface, with the V-grooves 7 on one side bank portion 1A being aligned with the V-grooves 7 on the other side bank portion 1C along the z-direction such that the tip end portions of the optical fibers placed in the V-grooves 7 from one side bank portion 1A side and the tip end portions of the optical fibers placed in the V-grooves 7 from the other side bank portion 1C side can be fusion spliced over the central portion 1B.

The V-grooves 7 on each of the side bank portions 1A and 1C are formed by a plurality of fixed members 5 in a shape of teeth of a comb which are formed integrally with the base frame 1 and arranged at a constant pitch along x-direction, and a plurality of thin plate shaped movable members 2 each of which is inserted between a guide groove 6 formed between each adjacent fixed members 5.

Figure 3:
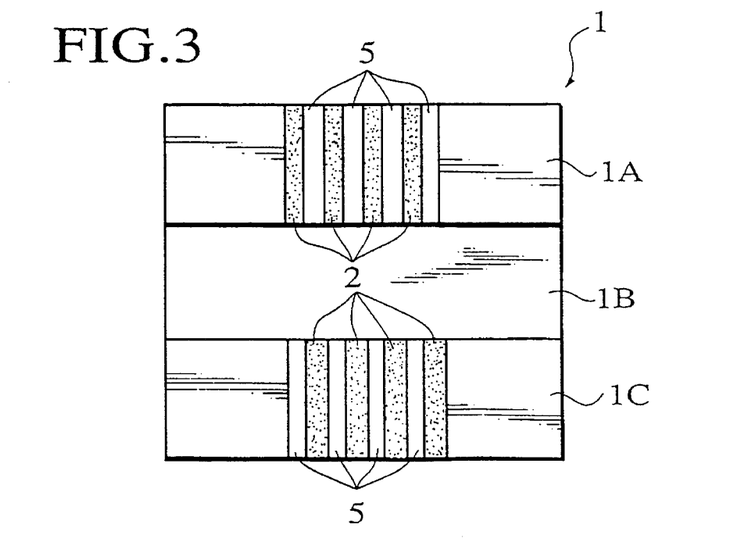
FIG. 3 is a top plan view of a base frame in the apparatus of FIG. 2.

Here, as shown in a top plan view of the base frame 1 shown in FIG. 3, the order of arrangement of the fixed members 5 and the movable members 2 on one side bank portion 1A is reversal of that on the other side bank portion 1C, i.e., displaced from each other by one pitch (a half of the width of the V-groove 7), such that each movable member 2 on one side bank portion 1A is facing against each fixed member 5 on the other side bank portion 1C across the central portion 1B and each fixed member 5 on one side bank portion 1A is facing against each movable member 2 on the other side bank portion 1C across the central portion 1B.

Figure 4:
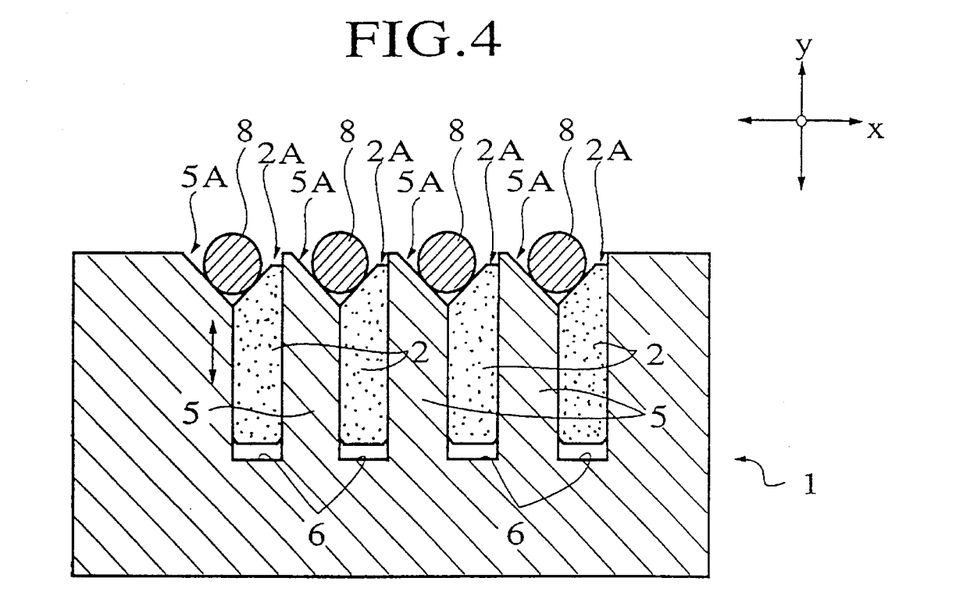
FIG. 4 is a cross sectional view of a side bank portion of a base frame in the apparatus of FIG. 2.

Also, as shown in a cross sectional view of FIG. 4, each V-groove 7 is defined by an inclined upper end face 5A of one fixed member 5 and an inclined upper end face 2A of one movable member 2 which are oppositely inclined with respect to the y-axis to meet with each other at their lower edges. Each movable member 2 is placed within the guide groove 6 defined by side walls of the adjacent fixed members 5 to be freely slidable up or down in the y-direction (direction of depth of the guide groove 6).

The movable members 2 are connected with respective piezoelectric elements 3 through respective attachment members 4 of appropriate lengths along the z-direction for connecting the movable members 2 with the piezoelectric elements 3. Here, as shown behind the side bank portion 1C in FIG. 2, each adjacent piezoelectric elements 3 are arranged to be displaced from each other in the z-direction as the width of each piezoelectric element 3 is wider than the width of each V-groove 7. It is to be noted that the movable members 2 on the side bank portion 1A side are also equipped with the piezoelectric elements 3 and the attachment members 4, even though the piezoelectric elements 3 and the attachment members 4 on the side bank portion 1A side are omitted in FIG. 2 in order to provide a clear view of the base frame 1.

Figure 5:
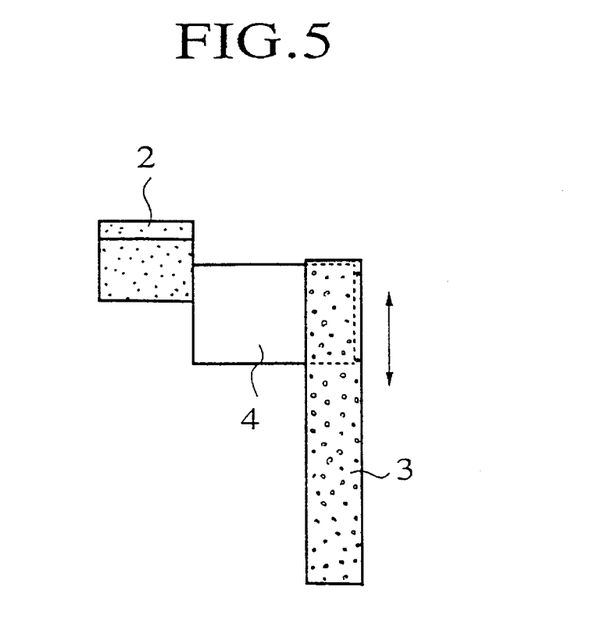
FIG. 5 is a schematic side view of a movable member and a piezoelectric element connected by an attachment member in the apparatus of FIG. 2.

Each piezoelectric element 3 is in a known stack type piezoelectric element which makes a minute extension or contraction in an order of several μm to several hundreds μm in its length direction (y-direction) according to an applied voltage. As shown in a side view of FIG. 5, each piezoelectric element 3 is attached to one end of the plate shaped attachment member 4 while the other end of the plate shaped attachment member 4 is attached to the movable member 2 such that the length direction of the piezoelectric element 3 is aligned with the movable direction of the movable member 2. Thus, the extension or contraction in the length direction of the stack type piezoelectric element 3 can be transmitted via the attachment member 4 to the movable member 2 to cause the up or down displacement of the movable member 2 in the y-direction within the guide groove 6. Consequently, it is possible to change the height of each movable member 2 individually and arbitrarily by changing the voltage applied to each piezoelectric member 3 appropriately.

Figures 6A, 6C:
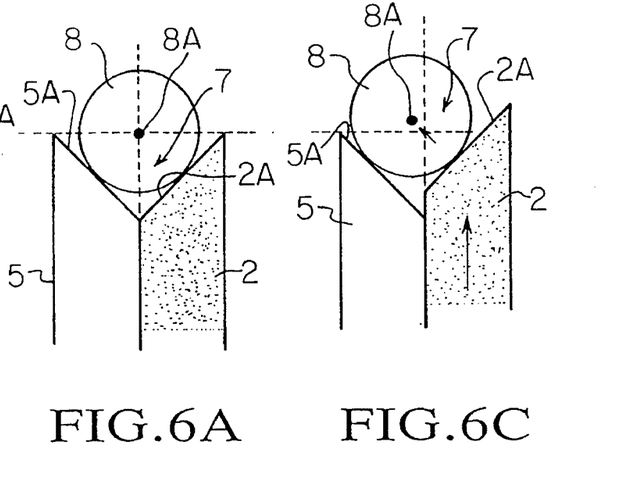
FIGS. 6A, 6B, 6C, 6D, and 6E are enlarged side views of a V-groove in the apparatus of FIG. 2 for explaining the adjustment of a position of an optical fiber placed in the V-groove.
Figure 6B:
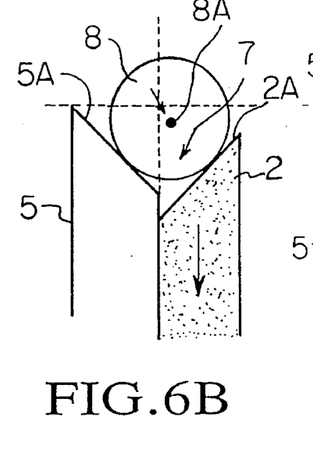

In the configuration described above, each optical fiber 8 is placed in each V-groove 7 by making contact with the end faces 2A and 5A of the movable member 2 and the fixed member 5 forming the V-groove 7 as shown in FIG. 6A. Then, when the voltage is applied to the piezoelectric element 3 connected with the movable member 2 to move the movable member 2 downwards as shown in FIG. 6B or upwards as shown in FIG. 6C, the shape of the V-groove 7 changes and the optical fiber 8 is displaced such that a position of a core axis 8A of the optical fiber 8 can be adjusted.

Figure 6D:
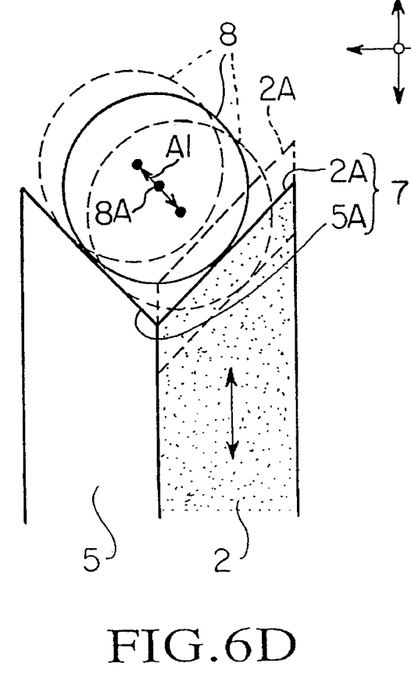
Figure 6E:
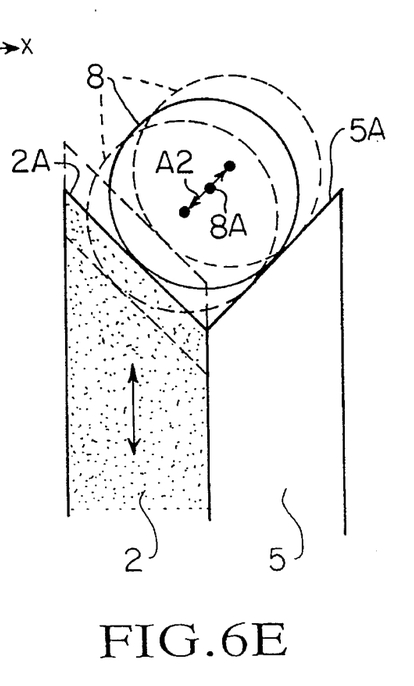

Here, as shown in FIG. 6D, on one side bank portion 1A side, the position of the core axis 8A of the optical fiber 8 can be adjusted along an arrow A1 in a −x, +y direction toward the upper left or a +x, −y direction toward the lower right by the upward or downward movement of the movable member 2, respectively. On the other hand, as shown in FIG. 6E, on the other side bank portion 1C side, the position of the core axis 8A of the optical fiber 8 can be adjusted along an arrow A2 in a −x, +y direction toward the upper right or a −x, −y direction toward the lower left by the upward or downward movement of the movable member 2, respectively. Consequently, by the suitable combination of these adjustments on one side bank portion 1A side and the other side bank portion 1C side, it is possible to align the optical fibers 8 to be fusion spliced together by adjusting the relative displacement of the optical fibers in any direction.

It is to be noted here that the movement of the movable member 2 in FIGS. 6D and 6E are depicted in exaggeration, and in practice, the movable member 23 moves for a distance in an order of μm or less while its thickness is in an order of hundred μm.

It is also to be noted that, in practice, the alignment of the optical fibers to be fusion spliced is usually realized by aligning the cladding axes of the optical fibers to be fusion spliced, rather than adjusting the alignment of the core axes of the optical fibers. Eventually, however, when the core axes are fused together, the core axes of the fusion spliced optical fibers are going to be aligned with each other.

In this embodiment, the adjacent movable members 2 are separated by a fixed member 5 located therebetween, so that it does not involve any sliding of the mutually contacting movable members as occurring in the conventional apparatus disclosed in Japanese Patent Application No. H3-280710 (1991) described above. Consequently, even when the optical fibers 8 in the adjacent V-grooves 7 are adjusted differently, the alignment error due to the mutual interference of the adjustments made in these adjacent V-grooves 7 does not occur, and therefore it is possible to provide an apparatus for adjusting the alignment of the optical fiber capable of realizing the reliable, simultaneous, high precision adjustment of the alignment of the optical fibers.

As for the opening angle of the V-groove 7 defined by the inclined end faces 2A and 5A of the movable member 2 and the fixed member 5, it is preferable to provide 90° opening angle (45° inclination in each of the end faces 2A and 5A) in view of the optimum efficiency for the adjustment of the position of the optical fibers 8 in response to the up or down movement of the movable member 2, and the optimum precision in the known two directional observation scheme for observing both the real and virtual images which is usually used as the scheme for monitoring the tip end portions of the optical fibers 8 facing against each other at the central portion 1B of the base frame 1 during the fusion splicing process. However, in a case the arrangement pitch of the optical fibers 8 is smaller, it may be more preferable to set the opening angle smaller such as about 30°.

Figure 7:
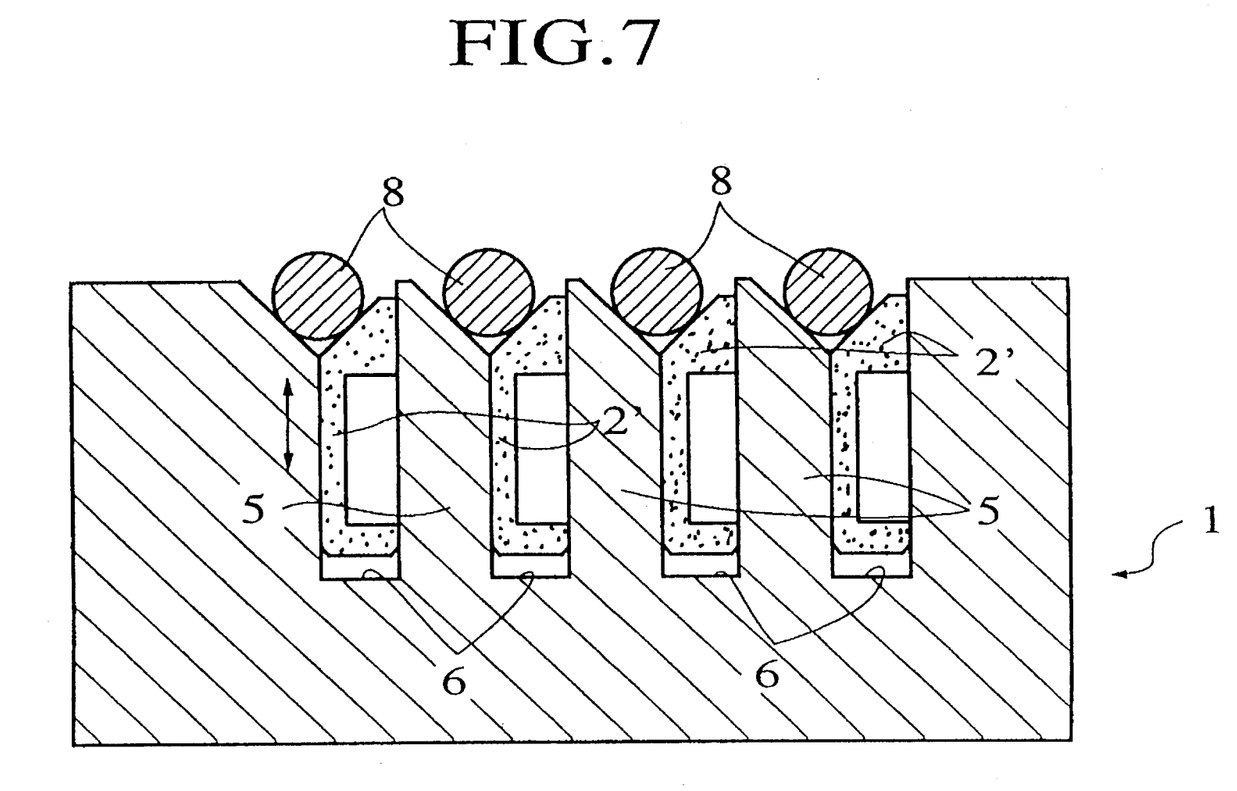
FIG. 7 is a cross sectional view of a modified configuration for a side bank portion of a base frame in the apparatus of FIG. 2.

It is possible to modify the embodiment described above in a manner shown in FIG. 7, in which each movable member 2' is not in the simple flat plate shape and having an approximately C-shaped cross section. With such movable members 2', it is possible to reduce the friction between the movable member 2' and the side wall of the fixed member so as to improve the efficiency for moving each movable member 2'. In addition, when the cleaning fluid such as alcohol is sprayed at a time of the fusion splicing process, it is also possible to reduce the surface tension of the liquid film caused by the sprayed cleaning fluid which functions to obstruct the movement of the movable portion 2'.

It is to be noted that the embodiment described above has incorporated a plurality of V-grooves 7 in order to handle the optical fiber ribbon, but the present invention is not necessarily limited to this case and can be adapted to a configuration for a single core optical fiber incorporating only a single V-groove 7.

It is also to be noted that, in the embodiment described above, the y-direction in which each movable member 2 moves has been depicted as the vertical direction, but the present invention is not necessarily limited to this case and the y-direction may very well be not in coincidence with the vertical direction.

It is also to be noted that the apparatus for adjusting an alignment of optical fibers according to the present invention is equally applicable to any types of aligning schemes including the cladding axis aligning, the core axis aligning, and the so called ECF (Eccentricity induced loss Canceling Function) aligning. (For the details of the ECF aligning, see Fujikura Technical Review, No. 16, pp. 16–18, 1987.

Moreover, the apparatus for adjusting an alignment of optical fibers according to the present invention is not just useful in the fusion splicing of the optical fibers, and can be applied to the other purposes such as the fiber to fiber connection, the fiber to connector connection, or the fiber to waveguide connection.

Next, the modified embodiments concerning the mechanism for moving the movable members 2 in the apparatus for adjusting an alignment of optical fibers according to the present invention will be described in detail.

Figure 8A:
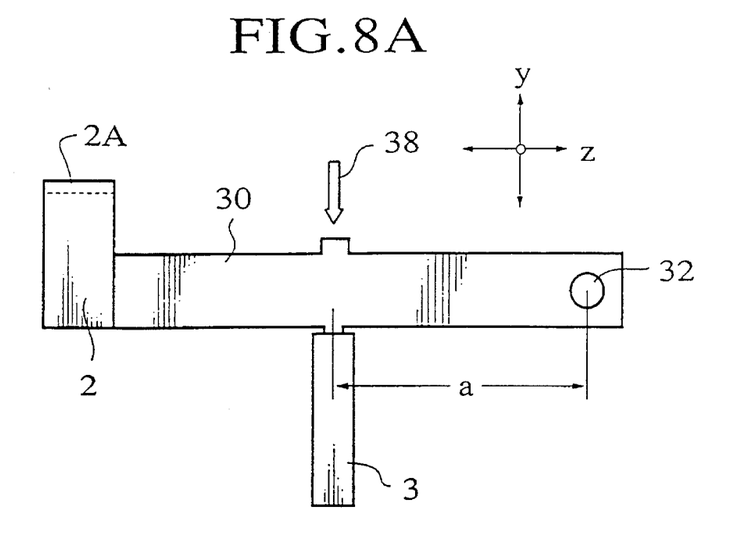
FIGS. 8A and 8B are side and perspective views, respectively, of one configuration for a movable member moving mechanism for the apparatus for adjusting an alignment of optical fibers according to the present invention.
Figure 8B:
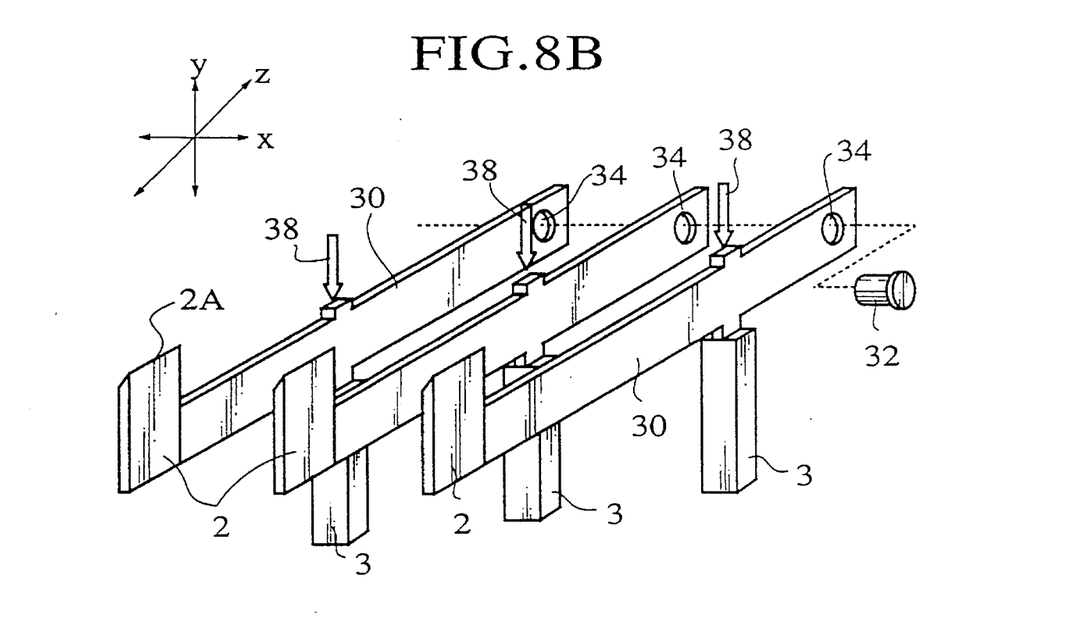

The one modified embodiment of the movable member moving mechanism has a configuration as shown in FIGS. 8A and 8B, in which the movable member 2 having an inclined end face 2A and the piezoelectric element 3 in a form of a piezoelectric actuator are connected by a long plate shaped arm 30 provided along the z-direction. This arm 30 has one free end attached to the movable member 2, another fixed end pivotally fixed to a main body (not shown) of the apparatus by means of a pin 32 inserted into a reamer hole 34 formed thereon, and a middle point abutted to the piezoelectric element 3 where the middle point is a distance "a" away from a center of the pin 32.

Here, the piezoelectric element 3 functions as a piezoelectric actuator capable of controlling its displacement in the ± y-direction in a range of several tens of μm in units of a tenth of μm according to the applied voltage, where the direction of extension or contraction of this piezoelectric element 3 is aligned with the direction of the up or down movement of the movable member 2 as described above. In this case, the piezoelectric element 3 at the middle point of the arm 30 receives a spring force 38 due to the weight of the movable member 2 at the free end of the arm 30.

In this configuration of FIGS. 8A and 8B, when the arm 30 is pivoted around the fixed end due to the extension or contraction of the piezoelectric member 3 in the y-direction, the movable member 2 can be moved up or down in the y-direction in proportion to the extension or contraction of the piezoelectric element 3, so as to adjust the position of the optical fiber in a manner described above.

This configuration of FIGS. 8A and 8B, however, is not quite satisfactory in the following aspects.

(1) The movable member 2 is required to be moved at the precision of 1.0 μm or less, but because of the use of the pin 32 and the reamer hole 34 at the pivotal point of the arm 30, the actual pivotal point can be displaced as much as 5 to 10 μm depending on a play in the engagement state of the pin 32 and the reamer hole 34, and for this reason it is difficult to achieve the stable operation at the satisfactory precision.

(2) In practice, it is necessary to displace the positions of the middle point at which the piezoelectric element 3 is to be abutted to the arm 30 among the neighboring arms 30, because the width of the piezoelectric element 3 in the x-direction is greater than that of the arm 30. Consequently, the different arms 30 have different distances "a" between the pivotal point (pin 32) to the middle point (piezoelectric element 3). However, when this distance "a" is different, the amount of displacement of the movable member 2 at the free end of the arm 30 can be different with respect to the same displacement stroke of the piezoelectric element 3. As a result, the voltages to be applied to the different piezoelectric elements 3 must be controlled in a complicated manner, even when the amount of displacement required for each movable member 2 is not much different from that of the other movable members 2 as happens very often in the practical optical fiber alignment adjustment process, and this in turn makes it difficult to make the accurate adjustment of the alignment of the optical fibers.

(3) The arms 30 are actually provided in close proximity with each other so that when one arm 30 is operated to move the movable member 2 attached to it, this one arm 30 may make a contact with the neighboring arms 30. Consequently, there is a possibility for the operation of the individual arm 30 to interfere with the operations of the other arms 30 such that it becomes difficult to make the accurate adjustment of the alignment of the optical fibers.

Figure 9A:
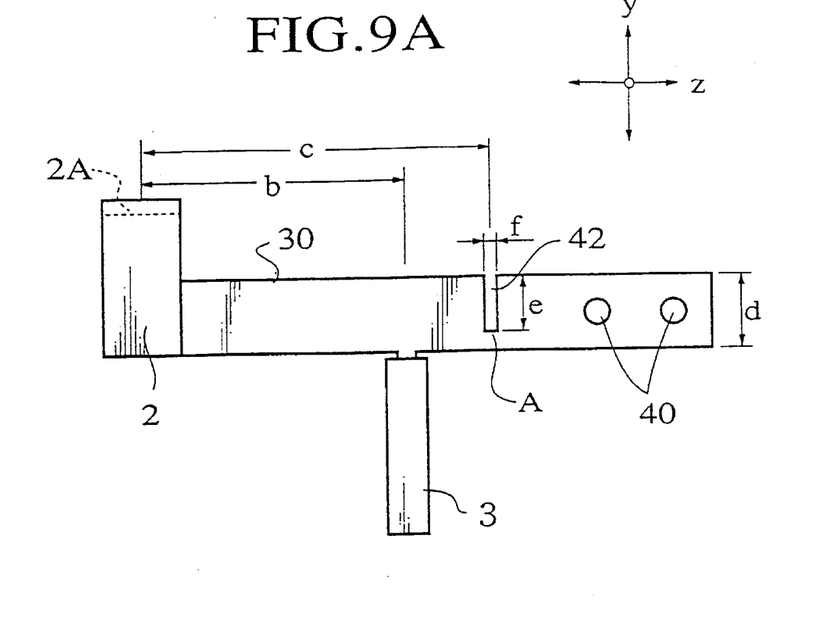
FIGS. 9A and 9B are side and perspective views, respectively, of another configuration for a movable member moving mechanism for the apparatus for adjusting an alignment of optical fibers according to the present invention.
Figure 9B:
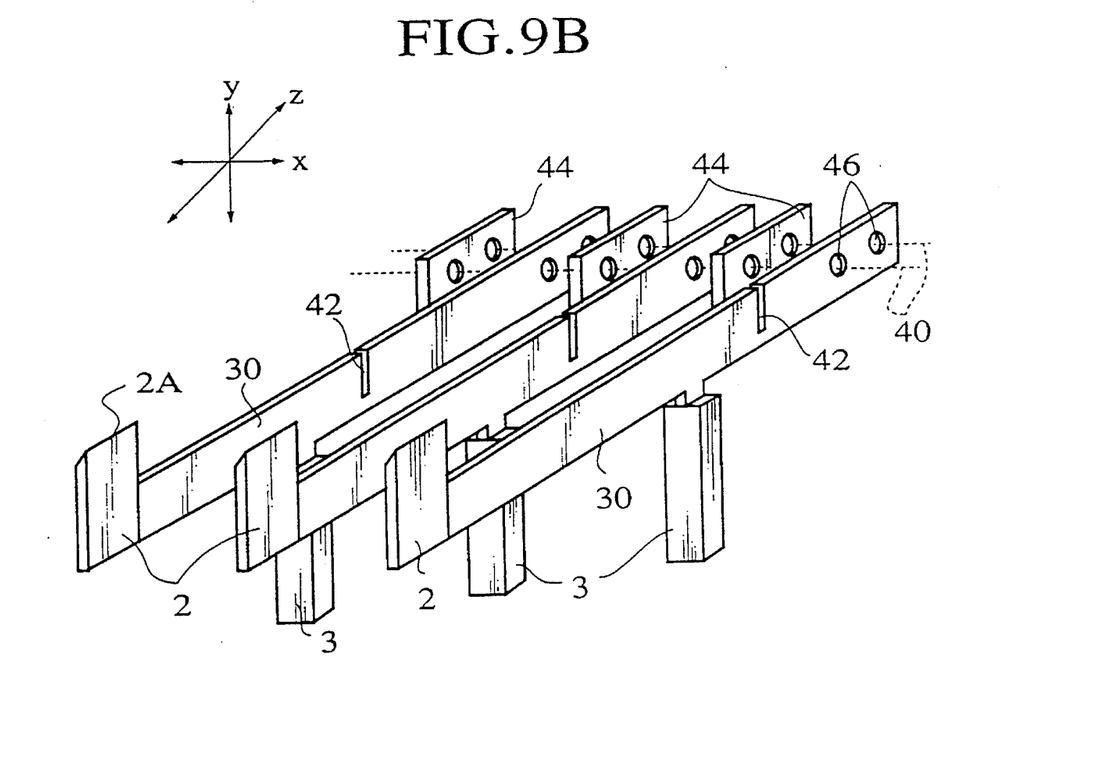

In order to resolve these problems associated with the configuration of FIGS. 8A and 8B, the configuration of the movable member moving mechanism can be modified as shown in FIGS. 9A and 9B.

Namely, in this modified configuration of FIGS. 9A and 9B, the arm 30 has one free end attached to the movable member 2, another fixed end firmly fixed to a main body (not shown) of the apparatus by means of bolts 40 inserted through a pair of holes 46 formed on the fixed ends of all the arms 30. In addition, the arm 30 is also equipped with a cut 42 on an upper side of the arm 30 in the y-direction for a depth "e" less than the width "d" of the arm 30 in the y-direction and a width "f" in the z-direction located between the fixed end and the middle point abutted to the piezoelectric element 3, such that tile displacement of the free end of the arm 30 due to the displacement of the piezoelectric element 3 can be caused by deforming this cut 42. Thus, this cut 42 is located at a distance "c" from a center of the movable member 2, while the piezoelectric element 3 is located at a distance "b" from a center of the movable member 2 and b<c as indicated in FIG. 9A.

In addition, as indicated in FIG. 9B, it is also possible to insert a spacer 44 between each neighboring arms 30 at the fixed end side of the arms 30, such that the neighboring arms 30 can maintain a prescribed amount of distance defined by the thickness of this spacer 44 with respect to each other in order to prevent the mutual interference of the operations of the neighboring arms 30 at the free end side.

In this modified configuration of FIGS. 9A and 9B, the arms 30 can make the elastic deformation at a bottom portion A of the cut 42 such that the free end side can be moved even when the fixed end side is firmly fixed. Consequently, the displacement of the pivotal point due to the play in the engagement state of the pin 32 and the reamer hole 34 in the configurations of FIGS. 8A and 8B which affected the stability of the operation is absent in this configuration of FIGS. 9A and 9B, and therefore the stable operation of the arms 30 can be realized.

Moreover, the position of each cut 42 on each arm 30 along the z-direction can be set independently from the cuts 42 on the other arms 30, so that the positions of the cuts 42 can be displaced along the z-direction among the arms 30 in correspondence to the displacement of the positions of the piezoelectric elements 3 along the z-direction among the arms 30. Here, by setting a ratio "b/c" of the distance "b" from the movable member 2 to the piezoelectric element 3 and the distance "c" from the movable member 2 to the cut 42 to be identical for all the arms 30, it is possible to make the amount of displacement of the movable member 2 with respect to the same displacement stroke of the piezoelectric element 3 to be identical in all the arms 30. Consequently, the control of the voltages to be applied to the piezoelectric elements 3 can be simplified and it becomes possible to realize the accurate adjustment of the alignment of the optical fibers.

Furthermore, by means of the spacers 44, it is possible to prevent the mutual interference of the operations of the neighboring arms 30 due to the contact between the neighboring arms 30 at the free end side, and consequently it becomes possible to realize the accurate adjustment of the alignment of the optical fibers by each movable member 2 individually.

In this configuration of FIGS. 9A and 9B, the spring force 38 exerted on the middle point in the configuration of FIGS. 8A and 8B to provide the restoring force for pushing the arm downwards to its original position is eliminated. In this case, however, by setting the 0 point of the piezoelectric element 3 along the y-direction to be a position at which the arm 30 is slightly raised in the y-direction, the restoring force acting in a direction of straightening the arm 30 can be provided by the elasticity of the arm 30 itself.

More specifically, it is preferable to form each arm 30 by a material capable of elastically deformed at the bottom portion A of the cut 42, either integrally or compositely, such as the hardened steel. The cut 42 can be formed in a thin slit shape. For example, when the width "d" of the arm 30 in the y-direction is 5 mm, the depth "e" of the cut 42 in the y-direction can be 3.5 mm, while the width "f" of the cut 42 in the z-direction can be 1.5 mm.

As for the piezoelectric element 3, the piezoelectric actuator called NLA-2×3×18 manufactured by the Tokin Co. Ltd., Japan, which is capable of producing the displacement of 15 μm/100 V can be used for instance.

Here, it is to be noted that it suffices for this cut 42 to make the width of the arm 30 to be partially narrower to make it easier to cause the elastic deformation of the arm 30, so that the shape of the cut 42 may not necessarily be limited to such a slit shape, and can be a V-shape or any other suitable shape.

It is also noted that, instead of forming the cut 42 on the upper side of the arm 30 downward along the y-direction as shown in FIGS. 9A and 9B, the cut 42 may be Formed on the lower side of the arm 30 upward along the y-direction if desired.

Also, the shape of the arm 30 is not necessarily limited to the long thin plate shape as shown in FIGS. 9A and 9B, and any suitable shape may be used instead.

Also, instead of inserting the plate shaped spacers 44 between the adjacent arms 30 as shown in FIG. 9B, the other equivalent means for separating the adjacent arms 30 from each other may be employed if desired.

Figure 10:
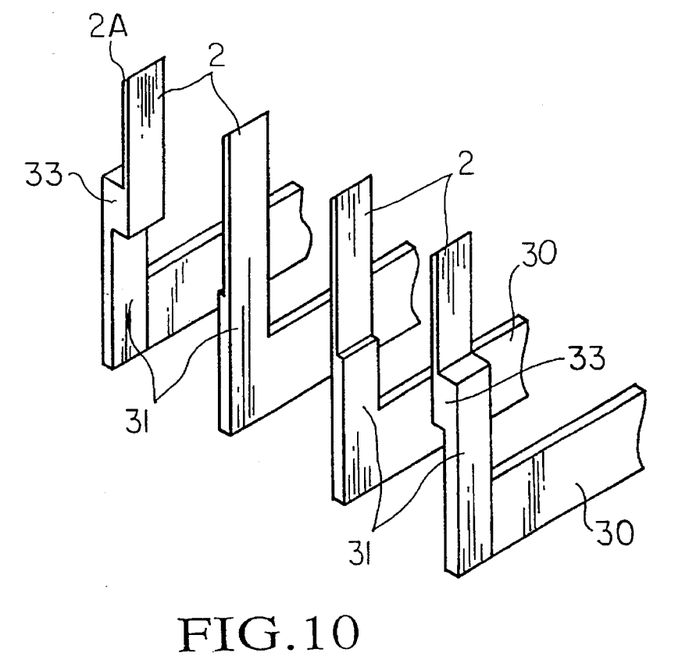
FIG. 10 is an enlarged perspective view of a detailed configuration of free end portion of arms in a movable member moving mechanism for the apparatus for adjusting an alignment of optical fibers according to the present invention.

In addition, the free end side of the arms 30 may be further modified as shown in detail in FIG. 10. Namely, the pitch of the movable members 2 must be in correspondence to the pitch of the core axes of the optical fibers, and the size of the arm 30 is generally large compared with such a small pitch of the movable member's 2, so that it is necessary to provide an interval between the adjacent arms which is larger than the pitch of the movable members 2.

To this end, the free end portion of each arm 30 can incorporate a rising portion 31 having an appropriate thickened portion 33 at an inner side of its tip end to which the movable member 2 is attached, such that the movable members 2 can be put in close proximity. Here, the height of the rising portion 31 of each arm 30 is set differently from that of the neighboring arms 30 in order to avoid the thickened portions 33 of the neighboring arms 30 to overlap with each other at the same height level. Also, in order to avoid the collision of the thickened portions 33 of the neighboring arms 30 when the respective movable members 2 move up and down, the-thickened portions 33 of the neighboring arms 30 are provided at the sufficiently different height levels to provide a sufficient gap between the lower edge of the thickened portion 33 on one arm 30 and the upper edge of the thickened portion 33 on the neighboring arm 30 such that these thickened portions 33 do not collide with each other even when the respective movable members 2 move up and down.

Next, the modified embodiments concerning the form of the base frame 1 in the apparatus for adjusting an alignment of optical fibers according to the present invention will be described in detail.

Figure 11A:
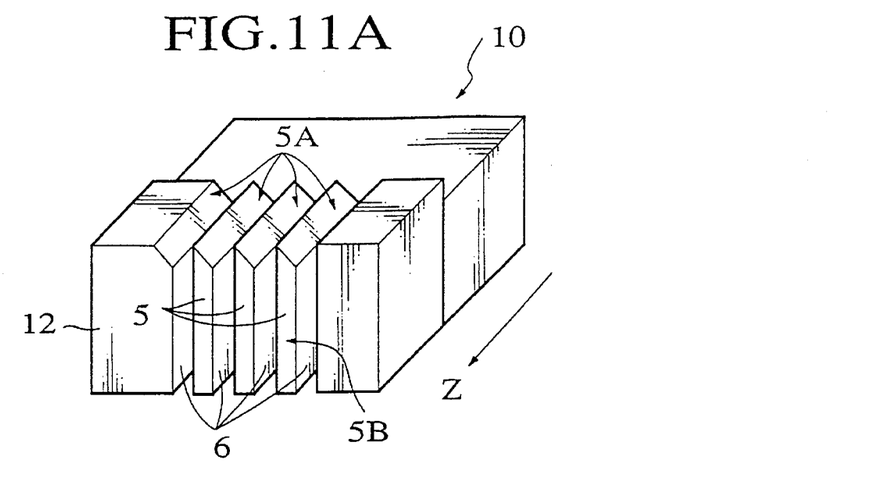
FIGS. 11A and 11b are perspective and top plan views, respectively, of one configuration for a V-groove block constituting a base frame of the apparatus for adjusting an alignment of optical fibers according to the present invention.
Figure 11B:
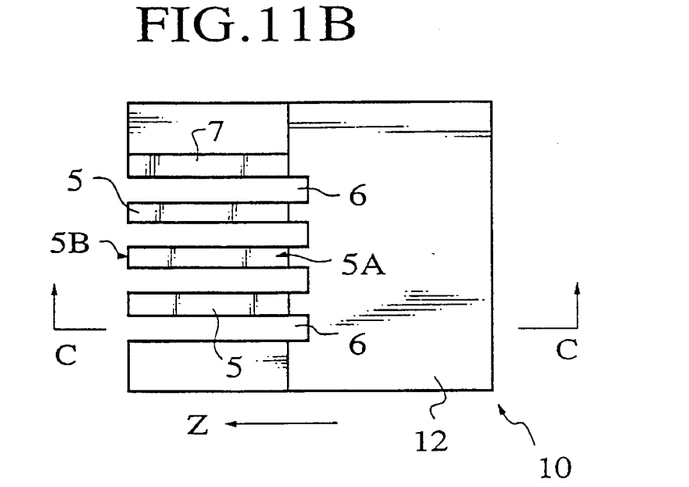
Figure 11C:
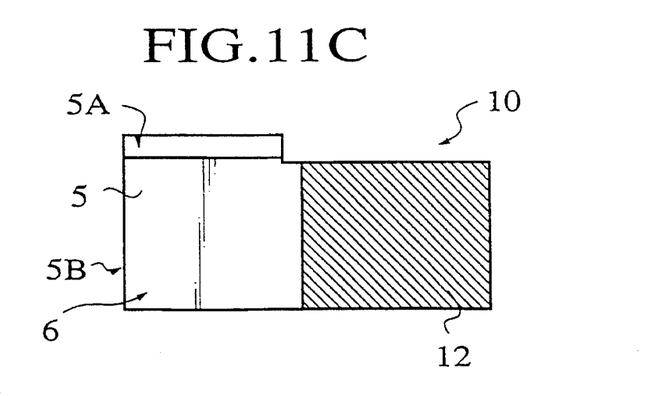
FIG. 11C is a cross sectional view of the V-groove block of FIGS. 11A and 11B along C—C line indicated in FIG. 11B.

In one modified embodiment of the base frame 1, each side bank portion of the base frame 1 is formed as a V-groove block having a configuration as shown in FIGS. 11A, 11B, and 11C when the movable members 2 are removed, which comprises a block body 12 having a plurality of fixed members 5 with inclined end faces 5A separated from each other by guide grooves 6.

Here, the movable member 2 has a thickness in an order of one hundred μm as already mentioned above, and each guide groove 6 for receiving the movable member 2 has a width slightly larger than that of the movable member 2 to provide a slight gap between the side walls of the fixed members 5 and the movable member 2 in order to secure the stable sliding movement of the movable member 2 within the guide groove 6.

In this configurations of FIGS. 11A, 11B, and 11C, the fixed members 5 are formed integrally on the block body 12 by forming the guide grooves 6 on the block body 12 by applying the wire-cut discharge machining for example from a front side of the block body 12 along the z-direction. Consequently, the guide grooves 6 are in open state at the front side of the block body 12 as shown in FIGS. 11A, 11B, and 11C. Here, the front side of the block body 12 is a side which faces toward the central portion 1B in the overall configuration of the base frame 1 shown in FIG. 1 described above.

This configuration of FIGS. 11A, 11B, and 11C, however, is not quite satisfactory in the following aspects.

Namely, the fixed members 5 formed in a shape of teeth of a comb are supported only on their rear side by the block body 12 and their front side 5B is not supported, so that the interval between the adjacent fixed members 5 on their front side 5B is unstable.

In addition, the thickness of each fixed member 5 is also as thin as in an order of hundred μm, so that each fixed member 5 itself is in a rather unstable state, and can be easily bent or damaged by the unexpected external force exerted thereon.

Figure 12:
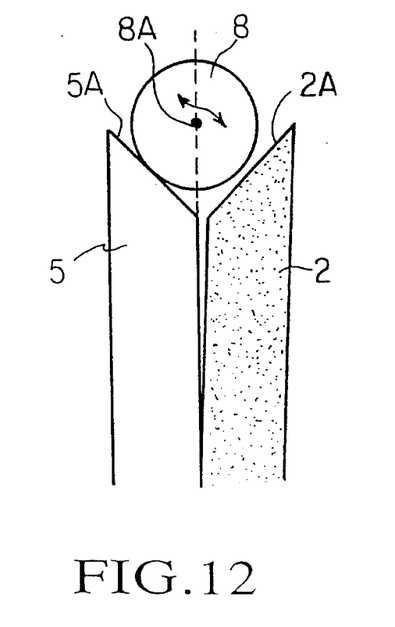
FIG. 12 is an enlarged side view of a V-groove in the V-groove block of FIGS. 11A and 11B.

As the movable member 2 is to make an up and down sliding movement within the guide groove 6 defined by such unstable fixed members 5, the movable member 2 can be bent in a state as shown in FIG. 12 at a time of assembling the movable members 2 with the V-groove block 10, or during the actual operation of the apparatus. In this case, the fixed members 5 do not possess the sufficient rigidity to correct such a bent of the movable member 2, so that the bent can be accumulated on the movable member 2. As a result, the movement direction of the movable member 2 can deviate from the guiding direction of the fixed member 5 such that the position of the core axis 8A of the optical fiber 8 cannot be adjusted along a straight line and it becomes difficult to adjust the position of the core axis 8A of the optical fiber 8 accurately.

Figure 13A:
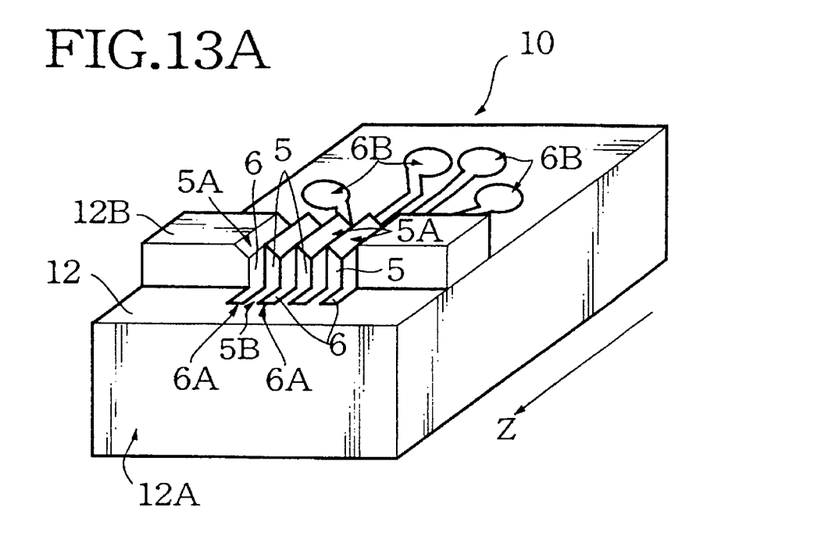
FIGS. 13A and 13B are perspective and top plan views, respectively, of another configuration for a V-groove block constituting a base frame of the apparatus for adjusting an alignment of optical fibers according to the present invention.
Figure 13B:
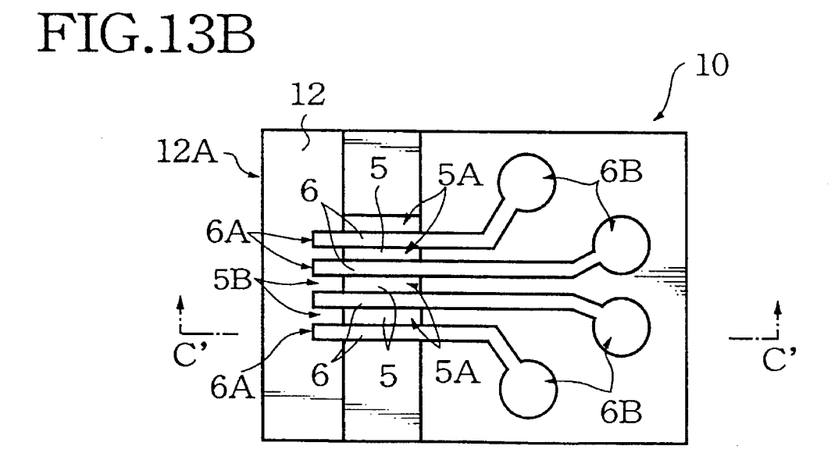
Figure 13C:
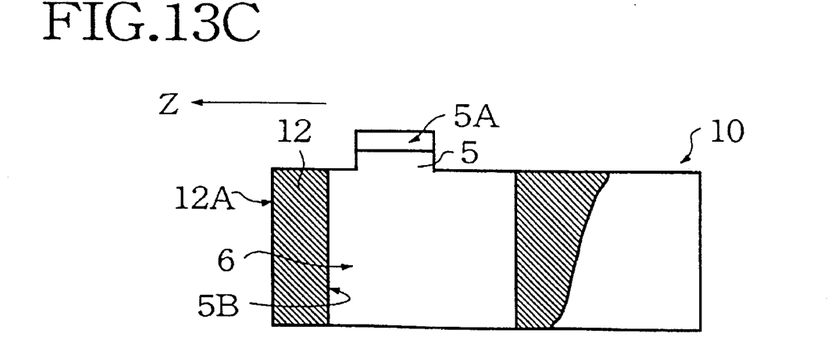
FIG. 13C is a cross sectional view of the V-groove block of FIGS. 13A and 13B along C'—C' line indicated in FIG. 13B.

In order to resolve these problems associated with the configuration of FIGS. 11A, 11B, and 11C, the configuration of the base frame can be modified as shown in FIGS. 13A, 3B, and 13C.

Namely, in this modified configuration of FIGS. 13A, 13B, and 13C, the front ends 6A of the guide grooves 6 are closed at positions receded from the front end 12A of the block body 12 such that the fixed members 5 are supported on both sides by the block body 12 and therefore the interval between the adjacent fixed members 5 can be stabilized to reduce the deformation or damaging of the fixed members 5. As a result, the movable member 2 to be guided within the guide groove 6 defined by these fixed members 5 can be stably positioned within the guide groove 6 and therefore the deformation or damaging of the movable member 2 can also be reduced. Consequently, in this modified configuration of FIGS. 13A, 13B, and 13C, it becomes possible to make the adjustment of the alignment of the optical fibers accurately.

More specifically, in this modified configuration of FIGS. 13A, 13B, and 13C, the V-groove block 10 is formed by the block body 12 having an upper protruded portion 12B on which the fixed members 5 are formed by forming the guide grooves 6 on the block body 12. Here, the guide grooves 6 are formed by applying the wire-cut discharge machining from starting holes 6B provided on the block body 12, up to the positions receded from the front end 12A of the block body 12 which are located between the upper protruded portion 12B and the front end 12A off the block body 12. Here, the guide grooves 6 are extended up to the positions between the upper protruded portion 12B and the front end 12A of the block body 12 such that the corners of the guide grooves 6 do not affect the movements of the movable members 2.

Here, each guide groove 6 is formed in a width of 125 μm for example. The starting holes 6B are piercing through the block body 12 such that the discharge machining wires are inserted therein at an initial stage of the wire-cut discharge machining, and the wire-cut discharge machining is carried out toward the front end 12A of the block body 12 to form the guide grooves 6. (In practice, the block body 12 is moved along the z-direction with respect to the discharge machining wires.) Then, the wire-cut discharge machining is stopped after the discharge machining wires passed the upper protruded portion 12B and before the discharge machining wires reaches to the front end 12A, so as to form the guide grooves 6 piercing through the block body 12 with their front ends 6A located at the positions receded from the front end 12A of the block body 12.

Then, the inclined end face 5A of each fixed member 5 is then manufactured on an upper side of each fixed member 5 after the guide grooves 6 are formed. After this wire-cut discharge machining, the start holes 6B can be left on the block body 12 as their presence does not affect the operation of the apparatus.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for adjusting an alignment of optical fibers, comprising:

a base frame having a plurality of pairs of V-grooves for mounting the optical fibers at mutually facing sides of the base frame, each V-groove being defined by a fixed member and a movable member, each movable member being movable within a guide groove defined between each adjacent fixed members, and one of each pair of V-grooves on one of said mutually facing sides has the fixed member and the movable member facing against the movable member and the fixed member, respectively, of another one of said each pair of V-grooves on another one of said mutually facing sides; and a plurality of piezoelectric elements, each of which is connected with each movable member of each V-groove, for causing said each movable member to move within the guide groove such that a displacement of said each movable member makes an adjustment of a position of an optical fiber mounted on said each V-groove.

2. The apparatus of claim 1, wherein the fixed member defining each V-groove is provided integrally with the base frame, while the movable member defining each V-groove is placed within the guide groove defined by each adjacent fixed members.

3. The apparatus of claim 1, wherein the fixed members on each one of said mutually facing sides are provided in a shape of teeth of a comb, while each movable member is provided in a thin plate shape slidably fitting into the guide groove.

4. The apparatus of claim 1, wherein each V-groove is defined by end faces of the fixed member and the movable member which are inclined oppositely with respect to each other and in contact with which each optical fiber is mounted on each V-groove.

5. The apparatus of claim 4, wherein the end faces of the fixed member and the movable member are inclined oppositely to define each V-groove with an opening angle equal to 90°.

6. The apparatus of claim 1, wherein each piezoelectric element is connected with each movable member of each V-groove through an attachment member attached to said each piezoelectric element on one end and attached with said each movable member on another end.

7. The apparatus of claim 1, wherein said plurality of piezoelectric elements are arranged to be mutually displaced from each other in a direction along which each pair of V-grooves are aligned.

8. The apparatus of claim 1, wherein said plurality of piezoelectric elements are connected with the movable members of a plurality of V-grooves on each one of said mutually facing sides by a plurality of arm members, each arm member having a fixed end fixedly supported with respect to the base frame, a free end attached with each movable member, a middle point abutted to each piezoelectric element, and a cut located between the fixed end and the middle point at which a width of the arm member is reduced compared with remaining portion of the arm member.

9. The apparatus of claim 8, wherein the cut of each arm member enables each movable member to move in response to an elastic deformation of the arm member at the cut caused by each piezoelectric element.

10. The apparatus of claim 8, wherein all the arm members have an identical ratio of a distance from the free end to the middle point with respect to a distance from the free end to the cut.

11. The apparatus of claim 8, wherein each arm member is separated by a prescribed distance at the fixed end from neighboring arm members.

12. The apparatus of claim 11, further comprising a spacer member for separating each arm member by a prescribed distance at the fixed end from each one of the neighboring arm members by being inserted between said each arm member and said each one of tile neighboring arm members.

13. The apparatus of claim 1, wherein the base frame comprises a pair of V-groove blocks, each V-groove block having a front end to be attached with the front end of another V-groove block in forming the base frame, and a plurality of V-grooves for mounting the optical fibers at one of said mutually facing sides off the base frame which are provided such that the guide groove defined between each adjacent fixed members is closed at a position receded from the front end of said each V-groove block.

14. The apparatus of claim 13, wherein each V-groove block has a protruded portion at which the V-grooves are formed, and said position receded from the front end is located between the front end and the protruded portion.

15. An apparatus for adjusting an alignment of optical fibers, comprising:

a base frame having at least one pair of V-grooves for mounting the optical fibers at mutually facing sides of the base frame, each V-groove being defined by a fixed member and a movable member which is movable within a guide groove defined by the fixed member, and one of said pair of V-grooves on one of said mutually facing sides has the fixed member and the movable member facing against the movable member and the fixed member, respectively, of another one of said pair of V-grooves on another one of said mutually facing sides; and at least one piezoelectric element connected with the movable member of each V-groove, for causing the movable member to move within the guide groove such that a displacement of the movable member makes an adjustment of a position of an optical fiber mounted on said each V-groove.

* * * * *